United States Patent [19]

Tarbox et al.

[11] Patent Number: 4,575,774
[45] Date of Patent: Mar. 11, 1986

[54] DISK SUBSYSTEM READ WRITE CONTROL

[75] Inventors: Bruce H. Tarbox, Billerica; Donald J. Rathbun, Andover, both of Mass.; Taian Su, Palo Alto, Calif.

[73] Assignee: Honeywell Information Systems Inc., Waltham, Mass.

[21] Appl. No.: 623,856

[22] Filed: Jun. 22, 1984

[51] Int. Cl.[4] ............................................. G11B 5/012
[52] U.S. Cl. .................................................. 360/72.2
[58] Field of Search ....................................... 360/72.2

[56] References Cited

U.S. PATENT DOCUMENTS 4,016,603  4/1977  Ottesen ............................. 360/135
4,279,004  7/1981  Yamashita et al. .................. 360/48
4,375,069  2/1983  Halvorsen et al. .................. 360/49

Primary Examiner—George G. Stellar
Attorney, Agent, or Firm—George Grayson; John S. Solakian

[57] ABSTRACT

A track on a disk surface of a disk drive is formatted in sectors, each sector having an address portion and a data portion. The disk drive generates a byte clock signal which increments a counter. The counter output signals address a read only memory which generates signals to control the address comparison in the address portion and the reading or writing of data bytes in the data portion of the sector.

2 Claims, 6 Drawing Figures

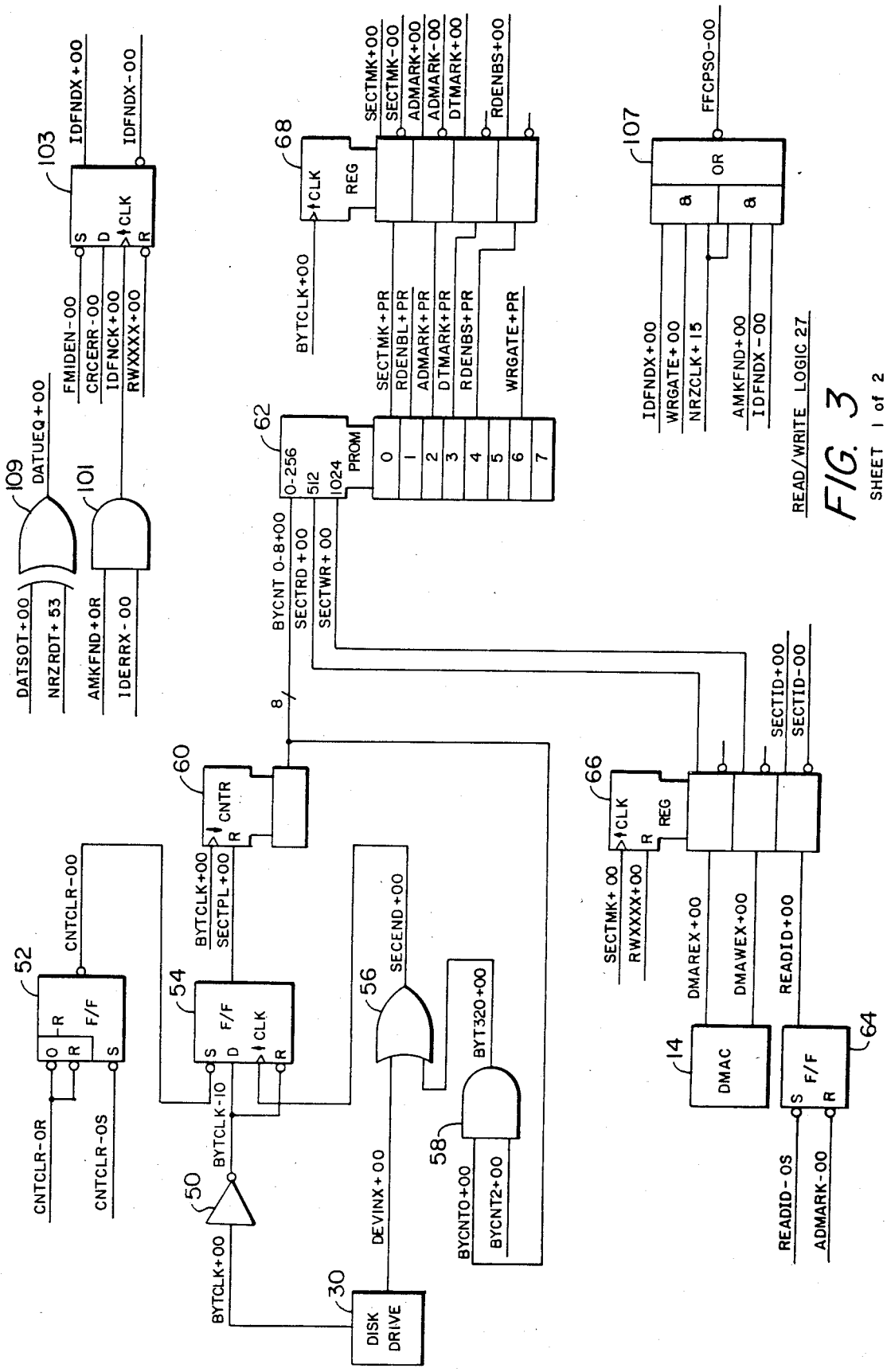
READ/WRITE LOGIC 27
FIG. 3 SHEET 1 of 2

READ/WRITE LOGIC 27
SHEET 2 of 2

PROM LOAD READ SECTOR ADDRESS - READ DATA

| | | ADDRESS (HEX) | CONTENTS (HEX) | |
|---|---|---|---|---|
| SECTOR MARK | | 001 | 01 | |
| SECTOR MARK | | 002 | 01 | |
| SECTOR MARK | (513 DECIMAL) | 201 | 01 | |
| | | 202 | 01 | (2) |
| | | | 00 | (6) |
| READ GATE ACTIVE | | 209 | 12 | |
| | | ↕ | ↕ | (9) |
| | | 211 | 12 | |
| READ ADDRESS MARK | | 212 | 16 | |
| | | ↕ | ↕ | (9) |
| | | 21A | 16 | |
| READ IDENT | | 21B | 12 | |
| | | ↕ | ↕ | (4) |
| | | 21E | 12 | |
| | | | 00 | (3) |
| | | | 00 | |
| READ GATE ACTIVE | | 222 | 12 | |
| | | ↕ | ↕ | (8) |
| | | 229 | 12 | |
| READ DATA MARK | | 22A | 1A | |
| | | ↕ | ↕ | (9) |
| | | 232 | 1A | |
| READ DATA | | 233 | 12 | |
| | | ↕ | ↕ | (265) |
| | | 33B | 12 | |

*FIG. 4*

PROM LOAD READ SECTOR ADDRESS — WRITE DATA

| | | ADDRESS (HEX) | CONTENTS (HEX) | |
|---|---|---|---|---|
| SECTOR MARK | | 001 | 01 | |
| SECTOR MARK | | 002 | 01 | |
| SECTOR MARK | (1025 DECIMAL) | 401 | 01 | |
| | | 402 | 01 | (2) |
| | | | 00 | (6) |
| READ GATE ACTIVE | | 409 | 12 | |
| | | ↕ | ↕ | (9) |
| | | 411 | 12 | |
| READ ADDRESS MARK | | 412 | 16 | |
| | | ↕ | ↕ | (9) |
| | | 41A | 16 | |
| READ IDENT | | 41B | 12 | |
| | | ↕ | ↕ | (4) |
| | | 41E | 12 | |
| | | | 00 | (3) |
| | | | 00 | |
| WRITE GATE ACTIVE | | 421 | 40 | |
| | | ↕ | ↕ | (269) |
| | | 52D | 40 | |
| WRITE EDAC BYTE | | 52E | 40 | |
| | | ↕ | ↕ | (4) |
| | | 531 | 40 | |
| WRITE DATA PAD | | 532 | 40 | |
| | | ↕ | ↕ | (3) |
| | | 534 | 40 | |
| WRITE INTERSECTOR GAP | | 535 | 40 | |
| | | ↕ | ↕ | (11) |
| | | 53F | 40 | |
| | | 540 | 00 | |

FIG. 5

DISK SUBSYSTEM READ WRITE CONTROL

RELATED APPLICATIONS

The following U.S. patent applications are assigned to the same assignee as the instant application and are related to the instant application and are hereby incorporated by reference.

1. "Single Revolution Disk Sector Formatter" by Bruce H. Tarbox, Donald J. Rathbun and Taian Su, having U.S. Ser. No. 613,936 and filed on May 25, 1984.
2. "Mass Stoage Disk Drive Defective Media Handling" by Donald J. Rathbun, Bruce H. Tarbox and Taian Su, having U.S. Ser. No. 618,640 and filed on June 8, 1984.

BACKGROUND OF THE INVENTION

1. Field of the Invention

This invention relates generally to a mass storage disk drive and more particularly to the logic which controls the reading of the address portion of a sector of a track for verification, and then either writing or reading the data portion of the sector.

2. Description of the Prior Art

Mass storage disk devices includes a number of disks rotating about a common vertical axis. Both the top and bottom surfaces of each disk are typically coated with a magnetic material which retains magnetic bits. One read/write head is mounted on a carriage which moves in a radial and perpendicular manner to the common axis. Magnetic bits are written on the media surface when the carriage has positioned itself. Each head, therefore, would write in turn on the respective surfaces. The magnetic bit patterns for a surface are in concentric circles called tracks. The same track number on each surface represents a cylinder. The magnetic bit patterns are written in zones called sectors. Typically each track could be divided into 42 sectors. Therefore, to select a sector of data (magnetic bits), the disk device requires a cylinder number, a head number and a sector number. Data bytes are transferred between the disk device and a main memory, a sector at a time.

Each sector includes an address portion and a data portion. The address portion includes the cylinder number, the head number and the sector number.

After receiving the sector address, the disk drive positions the carriage to the cylinder and the addressed head reads the sectors, comparing the address sent to the disk drive with the addresses written in the address portion of the sector. When there is agreement, then the data portion of the sector is processed.

Related U.S. application Ser. No. 613,936 entitled "Single Revolution Disk Sector Formatter" describes the formatting of the address portion fields and the data portion fields of each sector of a track. Since the fields were written magnetically by the system to which the disk drive is operative, the sectors are called soft sectors. This is differentiated from the head sector disk where the sectors are laid out by the manufacturer.

Controllers for soft sector disks used a firmware/hardware technique for reading the address portion of a sector, then reading or writing the data portion. Such systems use a considerable amount of hardware and results in variable length gaps within the data portion of the sector due to variations in motor speed of the disk drive.

OBJECTS OF THE INVENTION

Accordingly, it is a primary object of the invention to provide an improved disk drive subsystem.

It is an object of the invention to provide an improved disk drive subsystem having greater control of the read/write disk operation without regard to disk speed.

It is another object of the invention to provide apparatus for control of a read/write system having a reduced amount of hardware and firmware for controlling the read/write operation.

SUMMARY OF THE INVENTION

A sector of a track is made up of 320 bytes and includes an address portion and a data portion. The address portion includes a number of hexadecimal 00 bytes followed by a synchronization byte, hexadecimal FE, followed by an address field, followed by two cyclic redundancy check (CRC) bytes, followed by a three byte address field pad of hexadecimal 00's.

The data portion includes a number of hexadecimal 00 bytes followed by a synchronization byte, hexadecimal FE, followed by 256 data bytes, followed by four error detection and correction (EDAC) bytes, followed by a three byte data field pad of hexadecimal 00's.

During a read data operation, the controller reads the address portion of the sector to verify the address field, and then reads the data bytes. During a write operation, the controller reads the address portion of the sector to verify the address field, and then writes the entire data portion.

The disk drive generates an index signal, once per revolution; a byte clock signal, 320 times per sector; and a bit clock signal for each bit position.

The byte clock signal increments a counter which generates nine byte count signals. The byte count signals are applied to the address terminals of a read only memory (ROM).

The ROM includes a first area of sequential locations for storing hexadecimal characters for generating signals for processing a sector data read operation and a second area of sequential locations for storing hexadecimal characters for generating signals for processing a sector data write operation. A read signal from a direct memory access controller (DMAC) element selects the first area and a write signal from the DMAC selects the second area.

The index mark signal resets the counter to hexadecimal 000. Receiving the first byte clock signal advances the counter to 001. A hexadecimal 01 is stored in location 001 which when read out stores the sector mark signal. The sector mark signal stores either the read or write signal from the DMAC in a register. The read and write outputs of the register are applied to the address terminals of the ROM to select the first or second areas.

Subsequent locations when read out result in the read gate signal being activated resulting in the disk drive reading the address portion of the sector. In addition, a read address mark signal being generated from a ROM output signal causes the controller logic to be activated when a binary ONE bit from the sync character hexadecimal FE is received from the sector. This conditions the comparison between the address field read from the disk and the requested address field stored in a data FIFO. If there is a comparison, an ID found flop is set to condition the data FIFO to receive data from the data portion of a sector during a read operation. During a read operation, the read gate signal is activated from the ROM as well as a data mark signal.

The data mark signal conditions the controller to look for the synchronization byte, hexadecimal FE, in the data portion. When the first binary ONE bit is read, then the following data bytes are read into the data FIFO for transfer to a random access memory (RAM).

For the write operation, the address field is compared as above. The second area of ROM generates the same signals as the first area. If the address field compares, then the ROM generates a write gate signal and information is transferred from RAM, to data FIFO, to the data area of the sector.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 4 shows the contents of a portion of a read only memory which control a sector data read operation;

FIG. 5 shows the contents of a portion of a read only memory which control a sector data write operation.

DESCRIPTION OF THE PREFERRED EMBODIMENT

A disk drive, typically a random access mass storage device, with 8 inch rotating disks may store 24 megabytes or 40 megabytes, depending on the number of disks in the device.

Each disk includes 605 tracks for storing bytes of information. Each track stores 13,440 bytes which are organized in 42 sectors of 320 bytes each. The disk is characterized as a soft sector disk since sector header information is generated by software. A hard sector disk has the sector header information permanently written on the disk.

Figure 1:
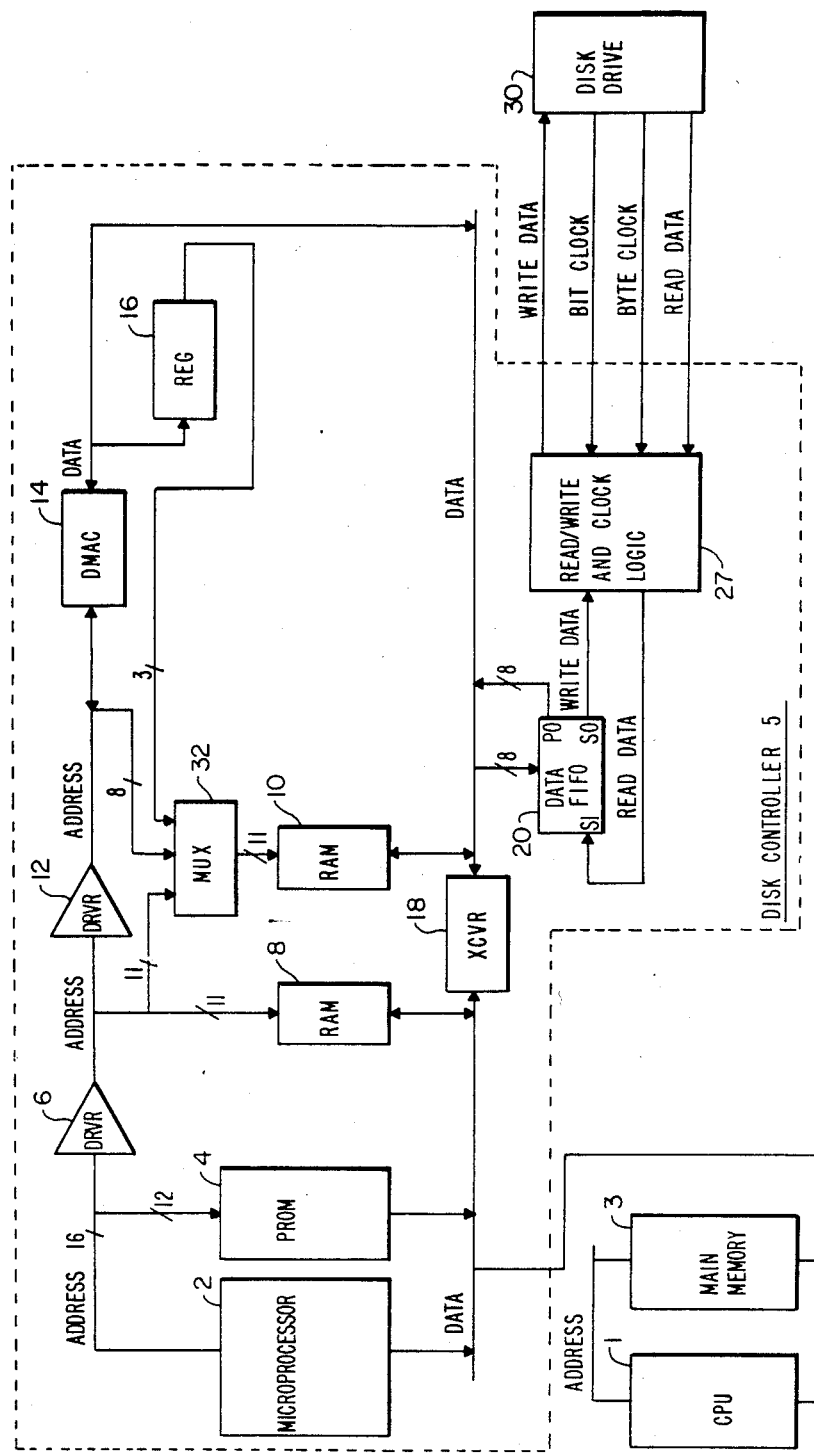
FIG. 1 is a block diagram of a disk controller.

FIG. 1 is a block diagram of a disk controller 5 which transfers blocks of data bytes, typically 256 bytes, between a disk drive 30 and a main memory 3. A multimode DMA controller (DMAC) 14 receives a starting address of a random access memory (RAM) 10 and a range indicating the number of bytes in the data block transfer, in this case 256 bytes, via drivers (DRVR) 6 and 12.

During a disk read operation, data bytes are read from a specified sector on the surface of the disk and stored in RAM 10 at an address specified by the DMAC 14 via a read/write and clock logic 27 and a data first in-first out memory (FIFO) 20.

The read/write and clock logic 27 receives a byte clock signal from disk drive 30 to coordinate the timing between the two units. The logic 27 receives the bit clock signal to time the data bits to be received by the disk drive 30 during a write operation.

During the read operation, serial data bits are transferred from disk drive 30 to the serial input (DS) terminal of the data FIFO 20 and then transferred, a byte at a time, to RAM 10. During the write operation, data bytes are received by data FIFO 20, serialized and transferred to the disk drive 30 via the serial out (QS) terminal of data FIFO 20 and logic 27.

The 256 address locations in RAM 10 are specified by the 8 address signals received by RAM 10 from the DMAC 14 via a MUX 32. The starting address stored in the DMAC 14 is incremented and the range stored in the DMAC 14 is decremented for each data byte stored in RAM 10. The data transfer is concluded when the range has counted down to ZERO.

The 256 data bytes are then transferred to main memory 3 from RAM 10. Microprocessor 2 generates sequential addresses which are applied to RAM 10 via DRVR 6 and MUX 32. CPU 1 stores the starting main memory 3 address and range. The data bytes read from RAM 10 are applied to main memory 3 via a transceiver (XCVR) 18.

During the disk drive 30 write operation, the 256 data byte block is transferred from main memory 3 at addresses specified by CPU 1 to RAM 10 at addresses specified by microprocessor 2. Microprocessor 2 addresses are applied to RAM 10 via DRVR 6 and MUX 32. The data bytes are applied to RAM 10 via XCVR 18.

When the block of data bytes is stored in RAM 10, microprocessor 2 loads the DMAC 14 with the starting address and range. Under DMAC 14 control, data bytes are read from RAM 10 to data FIFO 20 where the data byte is serialized and applied to the read/write and clock logic 27 and then to the disk drive 30 via the WRITE DATA signal line.

RAM's 8 and 10 store 2,048 bytes and therefore must be addressed by 11 address signals. The DMAC 14 provides 8 address signals and 3 address signals via a register 16 to RAM 10 via MUX 32.

Figure 2:
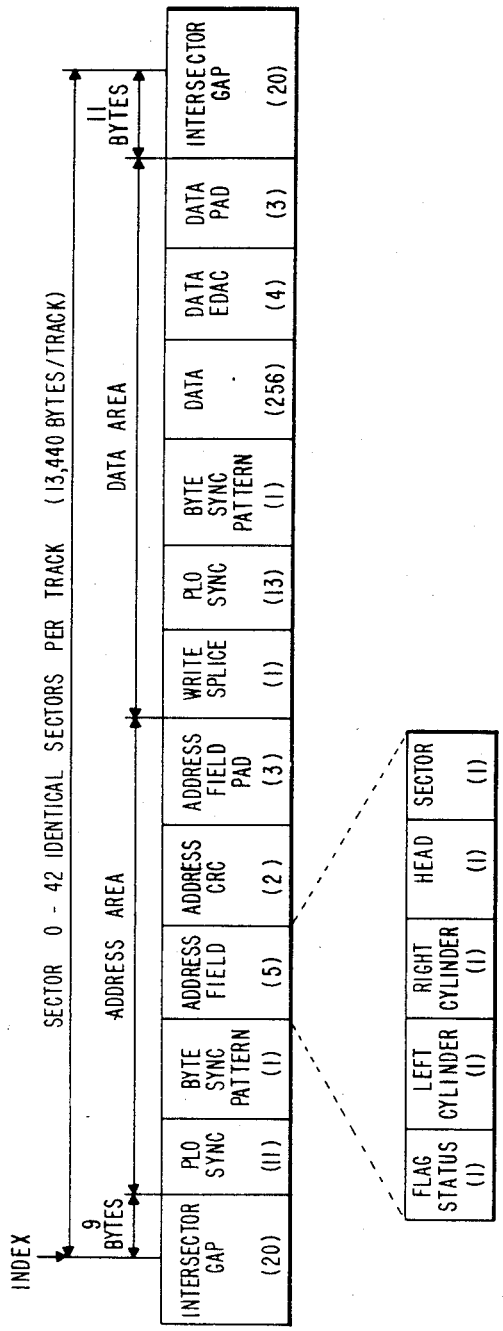
FIG. 2 shows the format of a sector of a disk track.

FIG. 2 shows the information format of one sector of a track. The format includes header information identifying track and variable data information. The format includes a 20 byte intersector gap, a 22 byte address area and a 278 byte data area.

Starting 11 bytes before an index mark (one per disk drive) is the 20 byte long intersection gap, each byte being hexadecimal 00. The intersection gap allows the logic to resynchronize to the next sector of the track being read.

The address area includes an 11 byte phase lock oscillator (PLO sync) of all ZERO bits to allow the read-data phase locked oscillator to become phase and frequency synchronized with the data bits recorded on the media.

A hexadecimal FE (binary 1111 1110) is written into the byte sync pattern area to establish byte synchronization between the logic and the data written on the disk.

The address field consists of 5 bytes. The flag status byte, hexadecimal 33, differentiates between a vendor-supplied format which provides a flag status byte of hexadecimal 00 and a controller-generated format. Two bytes, the left and right cylinder bytes, specify one of 605 cylinders. A cylinder includes the same track number on each surface. One byte selects a head to read one track of a selected cylinder and the last byte identifies one of 42 sectors.

The address cyclic redundancy check (CRC) bytes are written in accordance with a predetermined formula to verify that all of the bytes written in the address area are correct. Data integrity is maintained by the logic recalculating and verifying the CRC bytes whenever the address field is read.

The address field pad, 3 bytes of hexadecimal 00, insures that there is sufficient room on the track to write and read the last bits of the address CRC codes.

The data area of the sector includes a write splice field, one byte of hexadecimal 00. The write space field allows time for the write drivers to turn on and reach a recording amplitude sufficient to insure that data bytes are written properly after the address area is read for selecting the desired sector during a normal write operation.

The phase locked oscillator (PLO sync) field includes 13 bytes of hexadecimal 00 to allow the phase locked oscillator to become phase and frequency synchronized with the data bits read on the media.

The byte sync pattern, hexadecimal FE, establishes byte synchronization for the data field which follows. The data field stores 256 bytes of data sent to the disk drive by the CPU.

The four bytes of data error detection and correction codes (EDAC) maintain data integrity by recalculating and verifying the data field check codes when the data field is read. The EDAC corrects up to an 11 bit error.

The data pad field, 3 bytes of hexadecimal 00, insures that there is enough space in the sector in which to write the data field.

Figure 3:
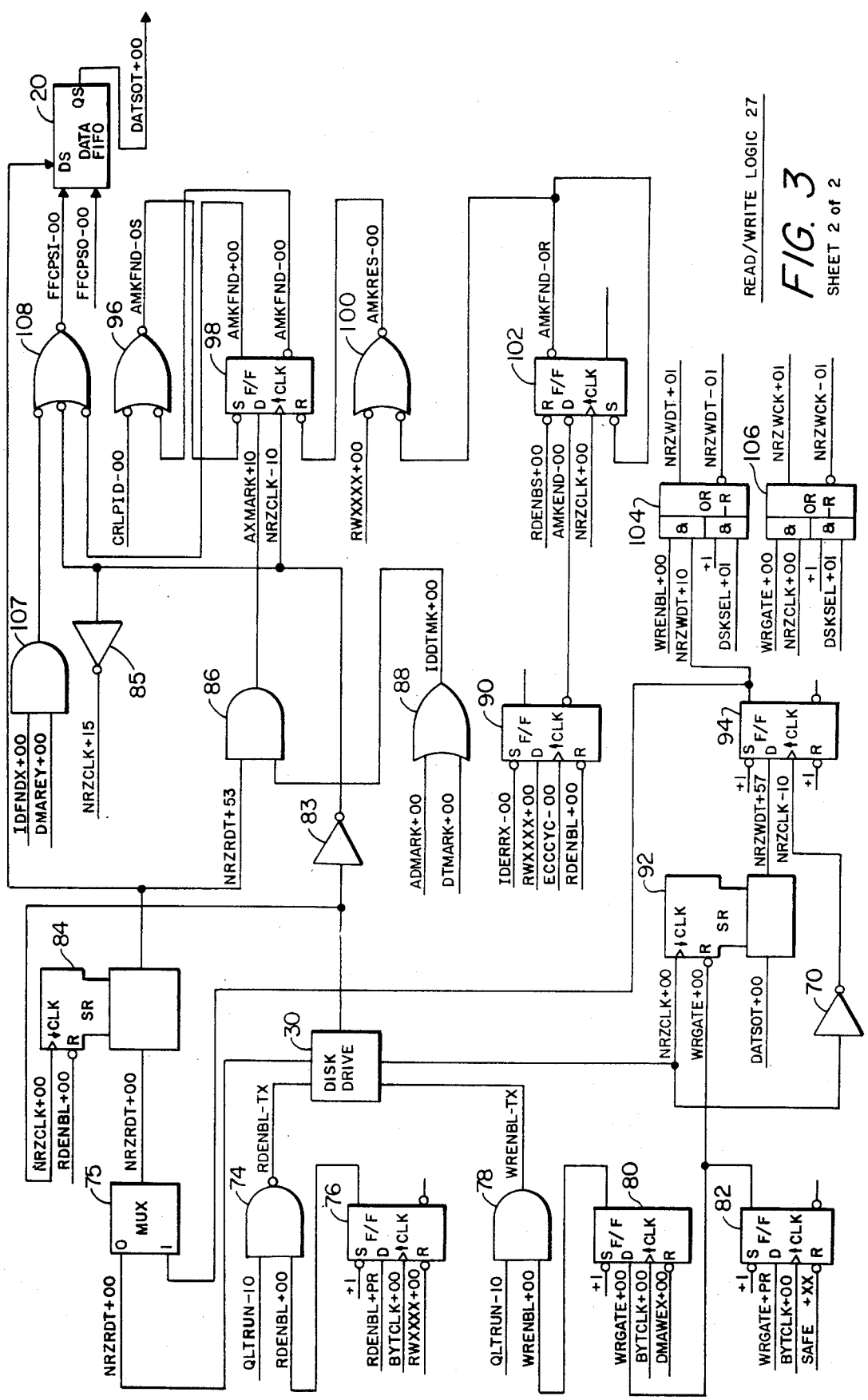
FIG. 3 shows the detailed logic of a read/write and clock logic portion of the disk controller.

Referring to FIG. 3, disk drive 30 generates an index signal DEVINX+00 once each revolution of the disk of disk drive 30 and a sequence of byte clock signals BYTCLK+00 for each byte position on a track on a disk surface.

Each sector on a track has 320 byte positions for storing information. A counter 60 is responsive to the fall of the byte clock signal BYTCLK+00 and generates nine output signals BYCNT0+00 through CYCNT8+00 which identify in turn each of the 320 byte positions. The nine byte count signals as well as the sector read signal SECTRD+00 and the sector write signal SECTWR+00 address a programmable read only memory (PROM) 62.

The counter 60 is reset to byte address 0 by the rise of the index signal DEVINX+00 from disk drive 30 via a NOR gate 56, a sector end signal SECEND+00, a flop 54 and a sector pulse signal SECTPL+00 applied to the R (reset) terminal.

Counter 60 may be cleared to hexadecimal 00 under the control of microprocessor 2. A CNTCLR−0S signal sets a flop 52. Output signal CNTCLR−00 low will cause flop 54 to set. This generates signal SECTPL+00 which resets counter 60. Flop 52 is reset by signal CNTCLR−0R from microprocessor 2.

Referring to both FIG. 3 and FIG. 4 for the read data operation, note that the starting address of PROM 62 is hexadecimal 201 which is equivalent to decimal 513. For the read data operation, a signal SECTRD+00 which is applied to address terminal 512 of PROM 62 is generated in the following manner.

Initially, the output signals BYCNT0−8+00 from counter 60 are all low indicating a count of hexadecimal 000. The count is incremented to hexadecimal 001 on the fall of the first byte clock signal BYTCLK+00 after the rise of the index signal DEVINX+00. The signals BYCNT0−8+00 indicating hexadecimal 001 are applied to the address terminals of PROM 62. From FIG. 4 the contents of address location 001 is hexadecimal 01 indicating the "0" output signal from PROM 62, a sector mark signal SECTMK+PR. Signal SECTMK+PR is stored in a register 68 on the rise of the next byte clock signal BYTCLK+00.

An output signal SECTMK+00 is generated and applied to a clock terminal of a register 66. Signal DMAREX+00 from DMAC 14 indicating a data read operation is stored in register 66 on the rise of signal SECTMK+00. Output signal SECTRD+00 applied to input address terminal 512 of PROM 62 selects address hexadecimal 202 which also stores a hexadecimal 01 as the next location read from PROM 62. The BYCNT0−8+00 count signals indicate a hexadecimal 02. At this time, the disk head is over the intersection gap field which contains a hexadecimal 00 byte.

Counter 60 addresses successive locations hexadecimal 203 through 208 of PROM 62 which contain hexadecimal 00 bytes. When location hexadecimal 209 is addressed, hexadecimal 12 is read from PROM 62 as signal RDENBS+PR which is stored in register 68 and signal RDENBL+PR which is applied to the D terminal of a flop 76. Flop 76 is set on the next rise of the BYTCLK+00 clock signal to generate a read enable signal RDENBL−TX via signal RDENBL+00 and a NAND gate 74. Signal RDENBL−TX activates a disk drive 30 read gate. Signal QLTRUN−10 disables NAND gate 74 during a test operation.

Signals RDENBL+PR and RDENBS+00 remain active through PROM 62 address locations hexadecimal 209 through 21E. Flop 76 is reset on the next rise of the BYTCLK+00 clock signal after signal RDENBL+00 is disactivated. Also flop 76 could be reset by microprocessor 2 signal RWXXXX+00.

The nine address locations hexadecimal 212 through 21A of PROM 62 store hexadecimal 16 which then read out generates the address mark signal ADMARK+PR as well as signals RDENBL+PR and RDENBS+PR. Both signals ADMARK+PR and RDENBS+PR are stored in register 68 on the next rise of the BYTCLK+00 signal.

The address mark signal ADMARK+00 from register 68 is applied to an OR gate 88 to condition an AND gate 86 via signal IDDTMK+00 to await the first byte containing a binary ONE bit over a signal NRZRDT+S3.

When the disk drive 30 receives the read enable signal RDENBL−TX, the addressed head starts reading the first sector on the addressed cylinder. A data signal NRZRDT+00 from disk drive 30 is applied to a shift register 84 via a multiplexer (MUX) 75 and a signal NRZRDT+10. MUX 75 receives a write data signal NRZWDT+10 during a wraparound test mode. Shift register 84 shifts data bits when enabled by the read enable signal RDENBL+00 on the fall of a bit clock signal NRZCLK+00 received from disk drive 30.

Figure 6:
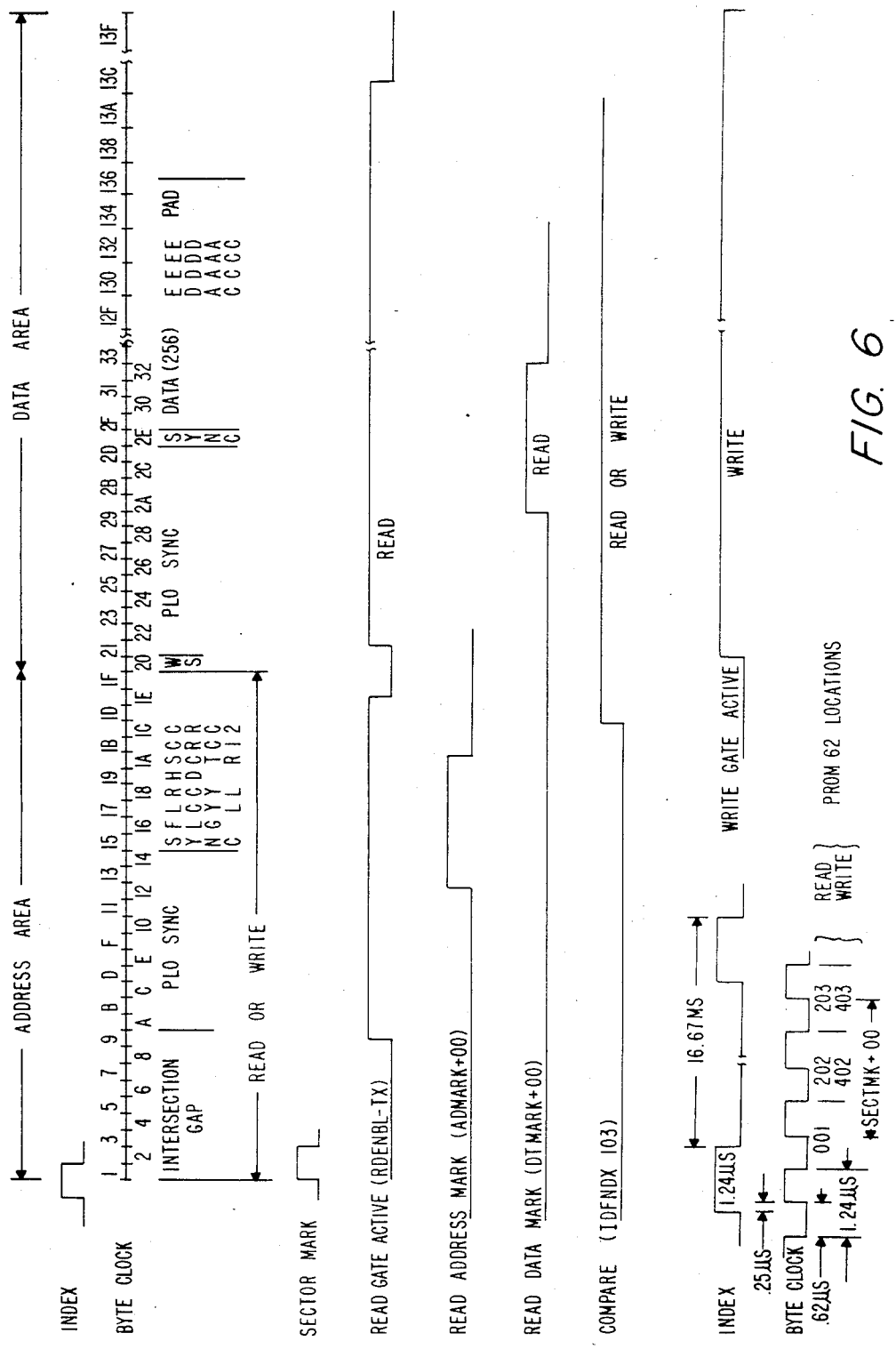
FIG. 6 is a timing diagram of the read and write operations.

Disk drive 30 reads data bits starting with the hexadecimal A byte clock, FIG. 6; that is, when signal RDENBL−TX activates the disk drive 30. A hexadecimal FE, the byte synchronization byte, is written in byte clock position hexadecimal 15. The first binary ONE data bit, therefore, will be received by shift register 84 at that time. Three bit clocks later, the binary ONE bit is applied to a D input terminal of a flop 98 via data signal NRZRDT+S3, AND gate 86 and signal AXMARK+10. AND gate 86 was previously conditioned by the address mark signal ADMARK+00, OR gate 88 and signal IDDTMK+00.

Flop 98 is set on the rise of the bit clock pulse NRZCLK−10 from an inverter 83. Address field found output signal AMKFND+00 is applied to an AND-/OR gate 107 to apply an NRZCLK+15 clock signal to data FIFO 20 via signal FFCPS0- 00. Signal NRZCLK+15 is delayed from clock signal NRZCLK−10 by the time delay of an inverter 85. Signal IDFNDX−00 is high at this time.

The sector address was previously stored in data FIFO 20 by the microprocessor 2. This sector address is compared with the sector address read from the track of a disk surface of disk drive 30. The data out signal DATS0T+00 is applied to an exclusive OR gate 109 and is compared with the data signal NRZRDT+S3 read from the track. If the comparison results in an unequal comparison indicating an incorrect track sector is addressed, then signal DATUEQ+00 is generated to indicate the error condition to microprocessor 2.

Flop 98 is held in a set condition by an output signal AMKFND−0S applied to an S (set) input terminal from a negative OR gate 96. Signal AMKFND−00 when low forces signal AMKFND−0S low. Since the AMKRES−00 signal applied to an R (reset) input terminal is high, flop 98 remains set regardless of the clock and D input signals.

The read address mark signal ADMARK+00 falls off when PROM 62 is addressed by hexadecimal 21B in which location is stored hexadecimal 12. However, flop 98 remains set for reading the two cyclic redundancy check (CRC) characters in byte positions hexadecimal 1B and 1C.

Flop 90 is set on the rise (trailing) of signal ECC-CYC−00 since signal RWXXXX is high for a disk read or write operation. Signal IDERRX−00 is high indicating no error and signal RDENBL+00 is high since the read gate is still active. Signal ECCCYC−00 rises after the second CRC character in byte clock position hexadecimal 1C is read.

Output signal AMKEND−00 low sets flop 102 on the rise of the NRZCLK+00 clock signal indicating the end of the CRC field. Output signal AMKFND−0R low resets flop 98 via a negative OR gate 100 and reset signal AMKRES−00. Signal RWXXXX+00 high conditions negative OR gate 100 to be responsive to reset signal AMKFND−0R for resetting flop 98.

Signal AMKRND+0R is applied to an AND gate 101. If there was no address sector compare error, signal IDERRX−00 is high; signal IDFNCK+00 then sets ID found flop 103. Signal FMIDEN−00 allows microprocessor 2 to set flop 103. Signal CRCERR−00 high indicates no cyclic redundancy check error. Signal RWXXXX+00 resets flop 103 at the end of the read and read or write operation.

The read gate active is disabled when address location hexadecimal 21F which stores hexadecimal 00 is read. This concludes the address area read operation by forcing signals RDENBL+PR, RDENBS+PR and RDENBS+00 low thereby resetting flops 76, 90 and 102. Flop 76 resets on the next BYTCLK+00 clock signal after signal RDENBL+PR is low thereby forcing the RDENBL−TX signal from the NAND gate 74 high.

The logic is now ready to process the data area by setting up to either a read data from disk or a write data onto disk operation. Assuming a read data operation, again PROM 62 location hexadecimal 222 is addressed and hexadecimal 12 outputted. Again the RDENBL+PR signal sets flop 76 and the read gate active signal RDENBL−TX is sent to disk drive 30 which starts to read the data area.

The data mark signal DTMARK+PR is generated when PROM 62 location hexadecimal 22A which stores hexadecimal 1A is addressed. Signals RDENBL+PR and RDENBS+PR which were generated when address location hexadecimal 222 was read continue to be generated. Their functions were described supra.

The DTMARK+PR signal is stored in register 68 on the rise of the BYTCLK+00 signal and signal DTMARK+00 is generated. Signal DTMARK+00 is applied to NOR gate 88 to generate signal IDDTMK+00 which conditions AND gate 86 to generate output signal AXMARK+10 upon AND gate 86 receiving the first binary ONE bit via data signal NRZRDT+S3. The data byte sync byte, hexadecimal FE, is read from byte clock position 2E. As described supra, flop 98 is set. This conditions negative OR gate 108 to receive the data clock signal NRZCLK−10 for transfer to the data FIFO 20 via signal FFCPSI+00 to clock the data signal NRZRDT+S3 received by the data FIFO 20. Flop 98 remains set until after the fourth error detection and correction (EDAC) character is read from byte clock position 132.

For the write operation, DMAC 14 generates signal DMAWEX+00 which is stored in register 66 on the rise of the sector mark signal SECTMK+00. A sector write output signal SECTWR+00 is applied to the 1024 address terminal (hexadecimal 400) of PROM 62. The sector mark signal is generated from PROM 62 address locations hexadecimal 001 and 402.

From FIG. 5, the contents of address locations hexadecimal 401 through 41E are the same as that of address locations hexadecimal 201 through 21E, FIG. 4, and result in the read sector address operation.

However, address location hexadecimal 421 stores a hexadecimal 40 resulting in a write gate signal WRGATE+PR being generated. This sets a flop 82 on the next rise of the byte clock signal BYTCLK+00. Output signal WRENBL+00 is applied to an AND gate 78 when not in a test mode (signal QLTRUN−10 high) to apply a write enable signal WRENBL+00 to the disk drive 30.

With signals IDFNDX+00 and WRGATE+00 applied to AND/OR gate 107 high, the bit clock signal NRZCLK+15 is applied to data FIFO 20 via signal FFCPS0−00. Signal WRGATE+00 also enables a shift register 92. A serial output signal DATS0T+00 from an OS terminal of data FIFO 20 is applied to serial register 92. The data bits stored in data FIFO 20 by microprocessor 2 are shifted through serial register 92 on the fall of each NRZCLK+00 bit clock signal from disk drive 30.

Each binary ONE data bit sets a flop 94 and each binary ZERO data bit resets flop 94 via a signal NRZWDT+S7 on the rise of the inverted (delayed by an inverter 70) NRZCLK−10 bit clock signal.

Complementary serial output signals NRZWDT+01 and NRZWDT−01 are applied to disk drive 30 via an AND/OR gate 104, flop 94 output signal NRZWDT+10 and write enable signal WRENBL+00. Complementary write clock signals NRZWCK+01 and NRZWCK−01 are applied to disk drive 30 via an AND/OR gate 106, bit clock signal NRZCLK+00 and write gate signal WRGATE+00.

Flop 82 is reset after address location 540 of PROM 62 which stores hexadecimal 00 is read forcing signal WRGATE+PR low. Signal WRGATE+00 going low causes flop 80 to reset on the rise of the next BYTCLK+00 clock signal.

Signal DSKSEL+01 under microprocessor 2 control and the +1 signal applied to AND/OR gates 104 and 106 enable the gate.

FIG. 4 shows the contents of PROM 62 which is active during a read data operation. Initially the counter 60 is reset and addresses location hexadecimal 000 of PROM 62 which contains hexadecimal 00. Counter 60 is incremented on each fall of the byte clock signal BYTCLK+00 from disk drive 30.

Address location 001 stores an 01 which generates the sector mark signal SECTMK+PR. This results in the generation of the sector read signal SECTRD+PR which is applied to the 512 input terminal of PROM 62. The next location addressed is hexadecimal 201 (decimal 513) which also stores hexadecimal 01. Signal SECTRD+PR remains active until location 203 is addressed.

Locations 203 through 208 store 00's. At this time the disk read/write head is passing over but not reading the first nine bytes of the intersector gap of FIG. 2.

The next nine locations addressed, 209 through 211 (209, 20A, 20B, 20C, 20D, 20E, 20F, 210, 211), store hexadecimal 12's resulting in the read gate enable signal RDENBL−TX being generated. Signal RDENBL−TX is active through the location addressed by 21E since the contents 12 and 16 both include the 1 bit and the 4 bit of PROM 62 (01 0010 and 010110) thereby generating signals RDENBL+PR and RDENBS+PR.

The 3 bit of the nine locations 212 through 21A result in the generation of the address mark signal ADMARK+PR. This results in the logic receiving the data bits read from the track and looking for the first binary ONE bit which should be found in the byte sync pattern field of the address area.

Once the binary ONE bit is read, the address field read from the track is compared with the address field information that was previously placed in the data FIFO 20. After the address CRC field is verified, if no errors resulted (proper cylinder, head, sector and CRC), then the read gate is deactivated after location 21E. Since this is a read operation, the read gate is again activated when location 222 is read. The read data mark signal DTMARK+00 is active for the nine locations 22A through 232 to condition the logic to sense the first binary ONE bit in the byte sync pattern field of the data area. The read gate stays active through location 33B to read the entire data field and error detection and correction (EDAC) field.

FIG. 5 shows the contents of PROM 62 used during the read sector address-write data operation. The sector write signal SECTWR+00 is applied to the 1024 (hexadecimal 400) address terminal of PROM 62. The locations 401 through 41E store the same information as locations 401 through 41E. After the address and CRC fields are checked and the read gate deactivated, reading location 421 results in the generation of the write gate signal WRGATE+PR. Information is loaded into the data FIFO 20 from RAM 10 under DMAC 14 control for transfer to disk drive 30. The write gate is deactivated after location 53F.

FIG. 6 shows a timing chart of the processing of sector 0 of a track. Subsequent sectors do not start with the index pulse but rather after 320 bytes of the previous sector was processed.

The format of FIG. 2 is identified with their respective byte clock signals. The timing relationship between the index signal, the byte clock signal and the sector mark signal are shown.

The initial formatting of a track is described in related application "Single Revolution Disk Sector Formatter" having U.S. Ser. No. 613,936 which is herein incorporated by reference.

The sector pulse signal SECTPL+00 clears counter 60 and starts the generation of PROM 62 addresses. The read gate active signal starts the disk drive 30 to read the track; however, the read address mark signal causes the read/write and clock signal 27 to test for the first binary ONE bit of the address area sync field (byte clock 15). Since the ID found flop 103 is not set, the logic compares the address field stored in data FIFO 20 with the address field being read. If the correct address field is read, then flop 103 sets.

The read gate is deactivated after the CRC field is read in order to give time for the write logic in disk drive 30 to be established if the next question is a write operation. The write splice (WS) byte assures the gap.

For the read operation, the read gate is again activated and the read data mark conditions the logic to sense the binary ONE bit of the sync byte (FE) in byte clock position 2E. Flop 103 is set to condition the data transfer from the disk drive 30 to data FIFO 20.

The index timing signal is shown as a 1.24 microsecond pulse every 16.67 milliseconds, once per revolution of the disk. The byte clock signal rises 1.24 microseconds after the rise of the index timing signal. The byte clock signal has a cycle time of 1.24 microseconds. Counter 60 is incremented on the fall of each byte clock signal thereby addressing each location of PROM 62 in turn.

For the write operation, the write gate is made active and data is transferred from RAM 10, to data FIFO 20, to disk drive 30.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the invention, therefore, to limit the invention only as indicated by the scope of the claims.

What is claimed is:

1. A disk subsystem including a disk drive and a controller, said controller including apparatus for controlling the reading and writing of information on a sector of a disk track, said apparatus comprising:

counting means coupled to said disk drive for keeping count of the number of byte clocks received by said counting means by a byte clock signal from said disk drive and generating byte count signals representative of said count;

read only memory (ROM) means coupled to said counting means and responsive to said byte count signals for reading out the contents of ROM locations addressed by said byte count signals and generating a plurality of control signals;

disk processing means coupled to said ROM means and responsive to a first control signal for reading sector address information;

information processing means coupled to said ROM means and said disk processing means and responsive to said first control signal and a second control signal for receiving said sector address information and generating a clock out signal;

first in-first out (FIFO) memory means for storing a requested sector address and responsive to said clock out signal for reading out said requested sector address; and comparing means coupled to said information processing means and said FIFO memory means for comparing said sector address information with said requested sector address and generating an address found signal for an equal comparison;

said disk processing means being responsive to said first control signal for reading sector data information from said sector during a read operation, and responsive to a third control signal for writing said sector data information in said sector during a write operation;

said information processing means being responsive to said address found signal for generating a clock in signal during said read operation, and responsive to said third control signal and said address found signal for generating said clock out signal during said write operation;

said FIFO memory means being responsive to said clock in signal for storing said sector data information received from said disk processing means during said read operation, and responsive to said clock out signal for transferring said data information to said disk processing means during said write operation.

2. Apparatus for controlling the reading and writing of a sector of a track of a disk drive, said sector including an address portion and a data portion, said apparatus comprising:

counting means for counting a sequence of byte clock signals and generating a sequence of a plurality of count signals representative of a number of said byte clock signals received from said disk drive;

read only memory (ROM) means coupled to said counting means and responsive to said sequence of said plurality of count signals for generating a sequence of a plurality of control signals;

disk means coupled to said ROM means and responsive to a first control signal for reading said address portion;

first in-first out (FIFO) memory means storing requested sector address information when said address portion is being read and storing data information received from said data portion during a read operation and storing said data information to be written in said data portion during a write operation;

said FIFO means being coupled to said ROM means and responsive to said first control signal and a second control signal for reading out said requested sector address information;

comparing means coupled to said FIFO memory means and said disk means for comparing said requested sector address information with said address portion and generating a found signal for an equal comparison;

said disk means being responsive to said first control signal for reading said data information during said read operation and responsive to a third control signal for writing said data information during said write operation;

said FIFO memory means being responsive to said found signal and a fourth control signal for storing said data information read from said data portion during said read operation, and responsive to said found signal and said third control signal for writing said data information into said data portion during said write operation.

* * * * *